United States Patent [19]

Bernstein et al.

[11] Patent Number: 5,586,296
[45] Date of Patent: Dec. 17, 1996

[54] CACHE CONTROL SYSTEM AND METHOD FOR SELECTIVELY PERFORMING A NON-CACHE ACCESS FOR INSTRUCTION DATA DEPENDING ON MEMORY LINE ACCESS FREQUENCY

[75] Inventors: David Bernstein, Haifa; Michael Rodeh, D.N. Oshrat, both of Israel

[73] Assignee: International Business Machines Corporation, Armonk, N.Y.

[21] Appl. No.: 156,532

[22] Filed: Nov. 23, 1993

[30] Foreign Application Priority Data

Dec. 2, 1992 [GB] United Kingdom ............ 9225211

[51] Int. Cl.$^6$ ............................................. G06F 12/00
[52] U.S. Cl. .................. 395/465; 395/450; 395/452; 395/838
[58] Field of Search ........................... 395/445, 452, 395/460, 463, 465, 466, 472, 481, 486, 487, 375, 838, 450, 451, 485

[56] References Cited

U.S. PATENT DOCUMENTS 5,170,476  12/1992  Laakso et al. ............... 395/452
5,253,351  10/1993  Yamamoto et al. .......... 395/445
5,375,216  12/1994  Moyer et al. ................. 395/450

*Primary Examiner*—Glenn Gossage
*Attorney, Agent, or Firm*—Ronald L. Drumheller

[57] ABSTRACT

A cache control system and method for operating a computer system which is capable of executing cached and non-cached memory accesses. The cache control system includes a frequency value store for each of a number of memory lines for storing a frequency value indicative of the number of accesses made thereto; an instruction store for storing the index of the last memory line accessed by each of a number of instructions; and control logic which, each time the processor attempts to access a memory location not in the cache memory, tests the frequency value for the last memory line accessed by the current instruction and, if the number of accesses for the memory line exceeds a predetermined threshold, (a) fetches the memory line of the memory location from the main memory into the cache memory and executes a cached memory access, and if not (b) executes a non-cached memory access.

7 Claims, 4 Drawing Sheets

FIG.5a

| INSTRUCTION TAG (ITAG) | MEMORY LINE POINTER (LM) | HISTORY (H) |
|---|---|---|
| | | |

FIG.5b

| MEMORY TAG (MTAG) | NUMBER OF ACCESSES (R) |
|---|---|
| | |

FIG.6a

| LOW BITS POINTER (LOW(LM)) | HISTORY (H) |
|---|---|
| | |

FIG.6b

| NUMBER OF ACCESSES (R) |
|---|
| |

CACHE CONTROL SYSTEM AND METHOD FOR SELECTIVELY PERFORMING A NON-CACHE ACCESS FOR INSTRUCTION DATA DEPENDING ON MEMORY LINE ACCESS FREQUENCY

BACKGROUND OF THE INVENTION

1. Field of the Invention

The invention relates generally to cache memory systems in computers and, more particularly, to an improved cache control system.

2. Related Art

Cache memory systems have been used in computers for many years and are intended to overcome access speed limitations of large storage devices by providing rapid access to a copy of a small set of a data held in a faster cache memory in anticipation of its likely use again in the near future.

However, one problem with cached memory is that very often the data structures that are accessed by computer programs do not fit into or are otherwise incompatible with the cache memory. One example of this is the referencing of a large matrix with a large stride. If the access to the computer memory is cached, then some of the memory accesses will cause a cache miss, that is the memory address sought by the computer is not in the cache. Thus every time a single element of the matrix is accessed a whole memory line may have to be brought into the cache. Very soon this memory line will be replaced by another subsequently referenced line, even before the rest of its elements have had a chance to be accessed.

Loading a cache line from memory has a certain cost associated with it both in terms of elapsed time and contention on the memory bus. In addition, it has a negative side effect by way of replacing an existing cache line which may be needed later. All in all, if the data structure is such that it does not fit into the cache, unnecessary memory traffic is created, resulting in poor performance.

In view of this problem some computers, for example the International Business Machines Corporation (IBM) Reduced Instruction Set Computer (RISC) System/6000 family of computers (IBM and RISC system/6000 are trade marks of International Business Machines Corporation, Armonk NY), have the facility to access memory in one of two different ways, either via cached access, that is access to the cache memory which causes an entire cache line to be retrieved from main memory to the cache memory if the required address is not already in the cache, or non-cached access, that is memory access in which only a single word is loaded directly from the main memory and which does not have any effect on the contents of the cache.

SUMMARY OF THE INVENTION

It is the object of this invention to provide an improved cache control system which employs both cached accesses and non-cached accesses as appropriate, thereby optimizing the use of the cache memory.

Accordingly the present invention provides a cache control method and system for use in a computer system comprising main memory and cache memory in which memory locations are arranged in memory lines each having an associated index and which is capable of executing cached and non-cached memory accesses. The cache control system includes a frequency value store for each of a number of the memory lines for storing a frequency value indicative of the number of accesses made thereto; an instruction store for storing the index of the last memory line accessed by each of a number of instructions; and control logic which, each time the processor attempts to access a memory location not in the cache memory, tests the frequency value for the last memory line accessed by the current instruction. If the number of accesses for the memory line exceeds a predetermined threshold, the control logic fetches the memory line of the memory location from the main memory into the cache memory and executes a cached memory access. If the number of accesses, for the memory line does not exceed the predetermined threshold, the control logic, executes a non-cached memory access.

By accumulating evidence regarding the profitability of loading a memory line into cache, a decision is made whether to execute memory access instructions in a cached or non-cached mode based on information about the memory line accessed by each instruction during its most recent execution. In this way optimum use of both cached and non-cached memory access can be achieved thereby improving the efficiency of memory access in the computer system.

The invention has the further advantage that it can be implemented without adding a new special instruction to the instruction set of the computer, or even recompiling the programs themselves.

Preferably less recent executions of the instructions are also taken into account by the instruction store storing a history value for each of the instructions and by the control logic increasing the history value each time execution of the instruction results in a cached memory access and decreasing the history value each time execution of the associated instruction results in a non-cached memory access and by, each time the processor attempts to access a memory location not in the cache memory, testing the history value for the current instruction and only executing a cached memory access if the history value for the current instruction has passed a predetermined threshold.

In one embodiment, the instruction store and the frequency value store are Least Recently Used (LRU) set associative tables. Alternatively, in a another embodiment, the instruction store and the frequency value store are collision tables.

BRIEF DESCRIPTION OF THE DRAWINGS

Embodiments of the invention will now be described by way of example with reference to the accompanying drawings, wherein:

FIGS. 5a and 5b show the tables IT and MT in a first embodiment of the invention;

FIGS. 6a and 6b show the tables IT and MT in a second embodiment of the invention.

DETAILED DESCRIPTION OF THE PREFERRED EMBODIMENT

Figure 1:
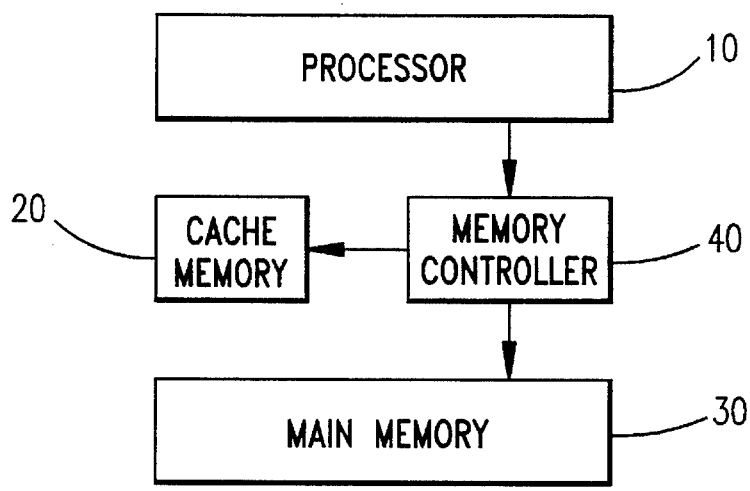
FIG. 1 shows a schematic view of the computer system of the embodiments of the invention.

Referring to FIG. 1, a computer system comprises processor 10,cache memory 20, main memory 30 and memory controller 40. Memory controller 40 controls access by the processor to cache 20 and to main memory 30 and also controls updating of the contents of the cache in accordance with a cache replacement algorithm. In the embodiments described here the cache replacement algorithm is of the least recently used (LRU) type. The operation of such an algorithm is well known to those skilled in the art and will not be described further herein.

Consider a program which runs on the computer system. Suppose the machine instructions of the program which access memory are stored in memory locations L1, L2, . . . , Ln. The content of memory location L will be denoted by (L).

Cache memory 20 is a relatively small, fast memory comprising a collection C1, C2, . . . , Cm of cache lines each of which contains several consecutive computer words. The main memory 30 is arranged in memory lines M1, M2, . . . of the same size as that of the cache lines.

The profitability of executing a memory access instruction I as a cached access, thereby occupying cache line Ck, depends on future memory accesses. If there will be a few memory accesses which will be served by Ck then the transfer is indeed beneficial. Otherwise, it actually slows the machine down. To capture this phenomenon, evidence is accumulated whether I should indeed be served as cached or non-cached access, and this information is used in the next execution of I.

Figure 2:
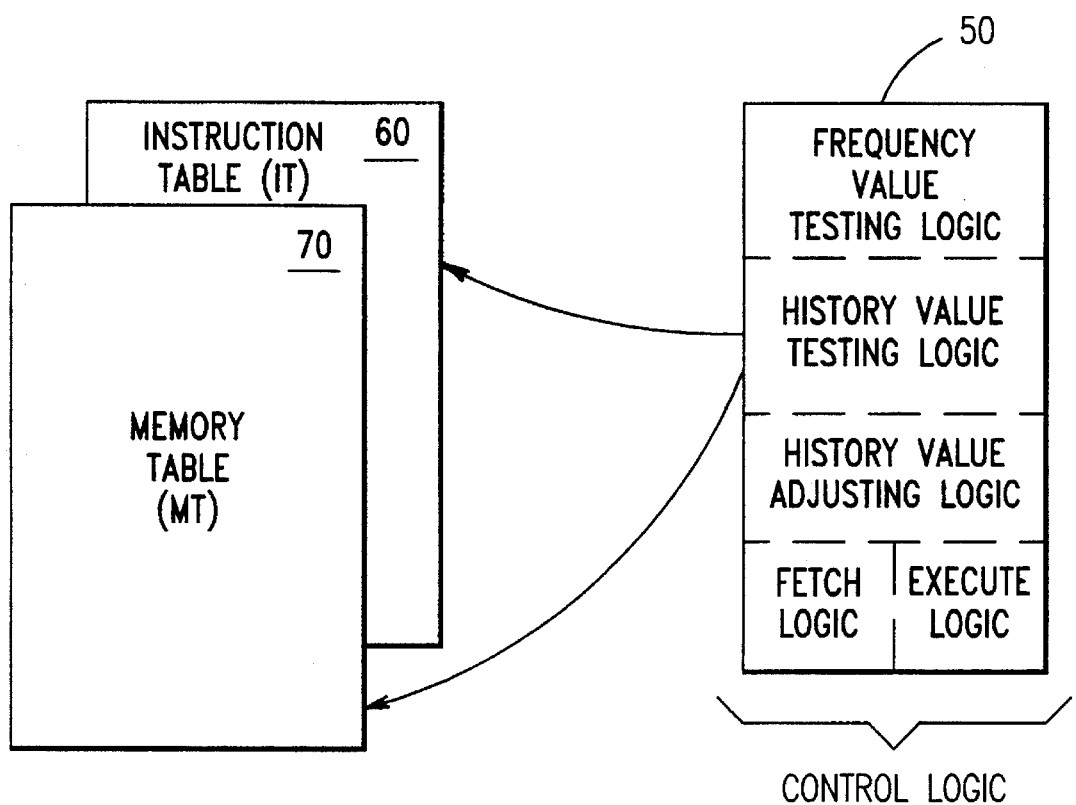
FIG. 2 shows a schematic view of the cache control system of the embodiments of the invention.

Referring to FIG. 2 memory controller 40 includes an instruction table (IT) 60 for keeping information about instructions that access memory locations and a memory table (MT) 70 for keeping information about memory lines. Memory controller 40 also includes control logic 50 which references the tables 60, 70 and performs either cached or non-cached memory accesses according to their contents.

With every memory access instruction stored in location L, the pointer to the most recent memory line accessed by (L) is kept in IT 60 in $LM_L$. For every memory line $M_i$, a frequency value, reference count $R_i$, indicating the number of references to $M_i$ is stored in MT 70.

The control logic 50 maintains the tables IT and MT and controls execution of either cached or non-cached memory accesses in the following way. Consider an execution of (L) which accesses memory line $M_i$. Two cases may arise. Either a cache hit is caused in which case control logic 50 sets $LM_L$ to point to line i and increases $R_i$ by 1 or a cache miss occurs in which case if $R_{LML}$ is larger than a threshold T, where T is greater than or equal to 1, then $M_i$ is fetched into cache, $LM_i$ is set to point to line i, and $R_i$ is set to 1. Otherwise, a non-cached memory access is executed and $LM_L$ is set to point to line i and $R_i$ is increased by 1. To avoid overflow a maximal value for $R_i$ is set and if $R_i$ reaches its maximal value and should be incremented, it stays unchanged.

In this way, evidence is accumulated regarding the profitability of loading memory line i into cache. Then a decision is made whether to execute memory access instructions in a cached or non-cached mode based on information about the memory line accessed by each instruction during its most recent execution.

In order to take into account less recent executions of the instructions a history value H is also used to determine whether or not to execute a non-cached memory access. Consider a memory access instruction I stored in location L. Let $H_L$ be a history value which depends on the past decisions made regarding cached vs. non-cached memory access associated with I. Consider the j-th execution of I: If the adaptive approach described above results in a cache hit, or results in a decision to execute a cached access, then $H_L$ is incremented by setting it to $H_L \times e + (1-e)$ where e is a constant between zero and one, and a cached access is executed. Otherwise, $H_L$ is decremented by setting it to $H_L \times e$. If $H_L$ is greater than a threshold Q then a cached access is made. Otherwise, a non-cached access is made.

In the preferred embodiment e=½ and Q=⅛. In this case, it is sufficient to maintain three bits for holding the value of HL. With these parameters three consecutive "bad" accesses will be required in order to make a non-cached access. However, one "good" access is sufficient to switch back to caching subsequent memory accesses.

In these embodiments the invention is implemented by modifications to the IBM RISC System/6000 processor as described in the article "MACHINE ORGANIZATION OF THE IBM RISC SYSTEM/6000 PROCESSOR" G. F. Grohoski, IBM Journal of Research and Development, Vol. 34, 1, p37 (1990) [hereinafter called reference R1].

Figure 3:
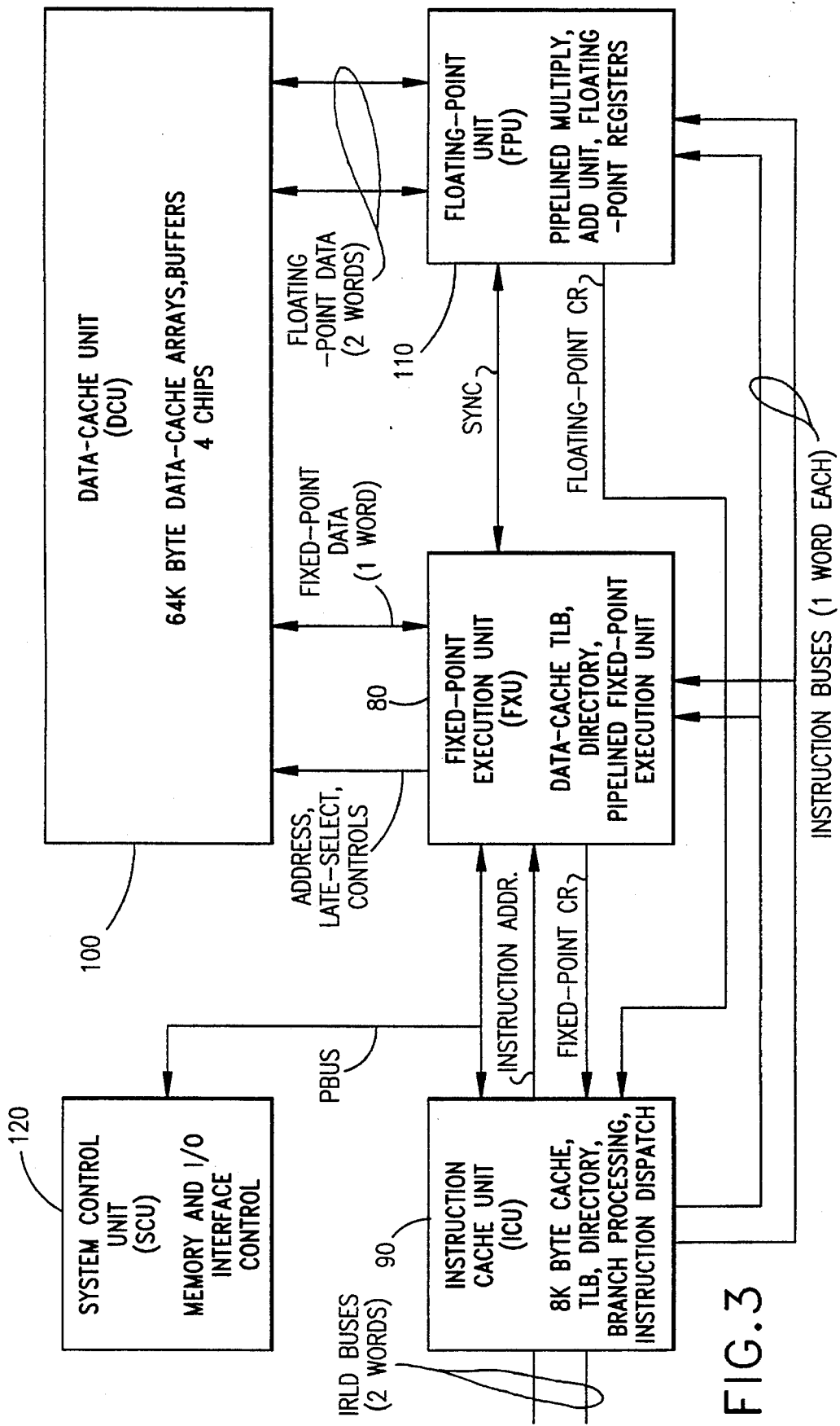
FIG. 3 is a schematic diagram of the RISC System/6000 processor in which the invention is implemented in the embodiments.

FIG. 3 is a schematic diagram showing the general organization of the RISC System/6000 processor. It comprises fixed point execution unit (FXU) 80, instruction cache unit (ICU) 90, data cache unit (DCU) 100, floating point unit (FPU) 110 and system control unit (SCU) 120. The operation of these components is described generally in reference R1.

The cache control system in these embodiments is implemented in hardware in the FXU chip 80, in which all the data cache directories are found. In the RISC System/6000 all the memory access instructions are performed by the FXU 80. The FXU 80 is connected to both the data cache and to the bus to main memory (now shown in FIG. 3). FXU 80 has the ability to make a non cached access for a data operand that has not been found in the data cache. However in the unmodified RISC System/6000, this is done only for operands located in special pages of memory that are marked as non-cacheable by the operating system in order to automatically maintain coherency between Input/Output (I/O) and the central memory.

In order to implement the present invention, the additional information that is required to be communicated to the FXU 80 by the instruction cache unit (ICU) 90 is the address of every memory access instruction. Both tables MT 70 and IT 60 along with the control logic 50 are implemented by suitable storage and logic in the FXU 80.

Figure 4:
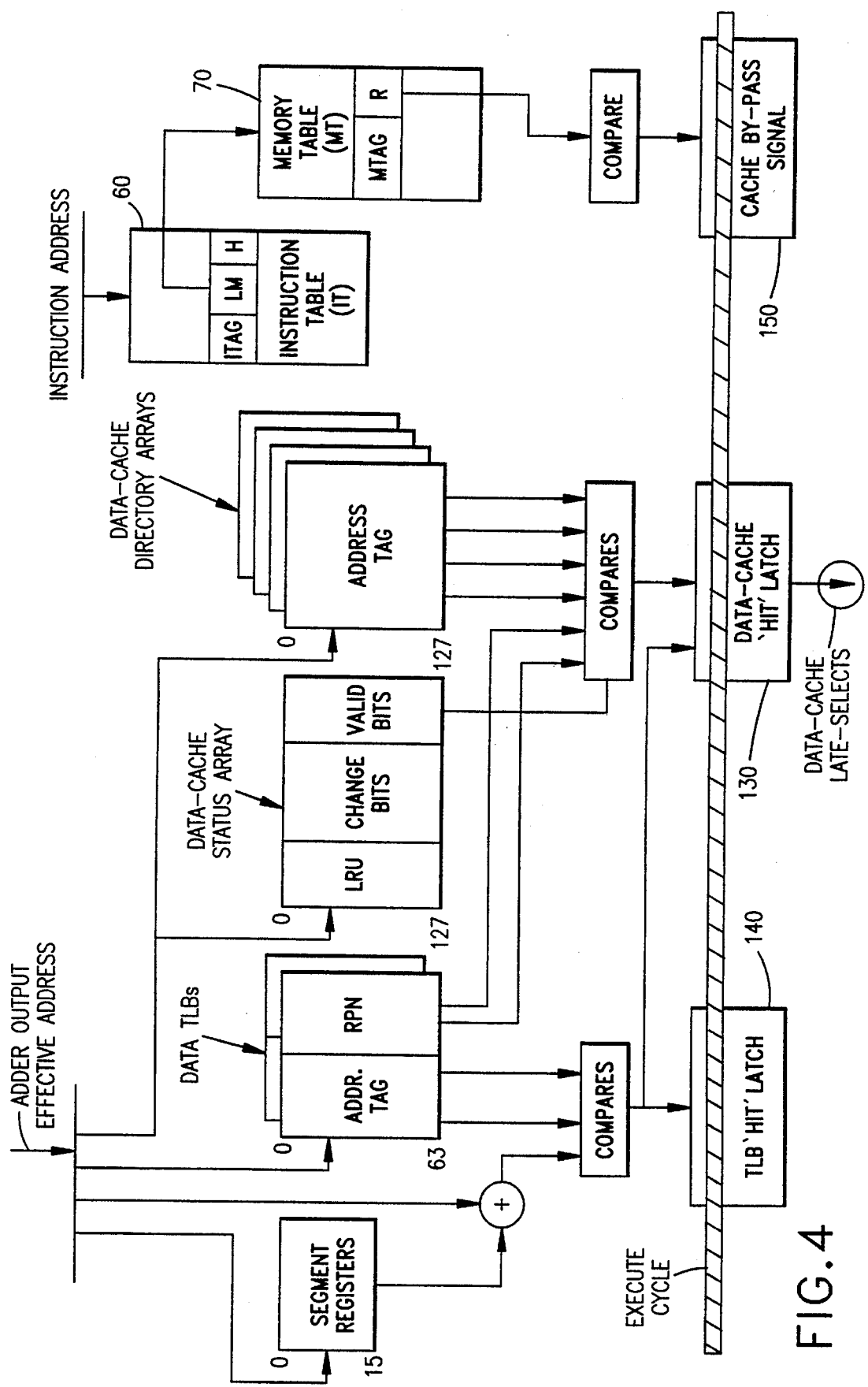
FIG. 4 as a schematic diagram showing the general organization and pipelining of the data translation lookaside buffer and the data cache status arrays in the embodiments.

FIG. 4 is a schematic diagram showing the general organization and pipelining of the data translation lookaside Buffer (TLB) and the data-cache status arrays in the embodiments of the invention. FIG. 4 corresponds to FIG. 8 of reference R1 for the unmodified processor and a description of the unmodified aspects of FIG. 4 can be found in reference R1.

The following issues have to be determined in parallel: (a) whether the current memory access is a TLB hit, in which case TLB "hit" latch 140 is set; (b) whether the current memory access is a data-cache hit, in which case Data-cache "hit" latch 130 is set; and (c) if the current memory access is not a data-cache hit, whether the current memory access should be done as a cached or non-cached memory access. This is determined by the methods in accordance with the invention. If the decision is to execute a non-cached access this is indicated by cache bypass signal 150.

Modifying the RISC System/6000 processor in this way does not require the cycle time of the processor to be extended.

Since the total number of distinct instructions and memory lines is very large, it is impractical to include entries in tables 60 and 70 for them all. Here two different embodiments are described in which different ways of implementing finite IT and MT tables, namely, using LRU set associative tables and collision tables.

1. Set Associative Tables.

This type of table is similar to the implementation of the data cache directories is governed by the Least Recently Used (LRU) replacement algorithm. IT includes the information about recent memory accesses. As illustrated in FIG. 5a, , each entry of IT includes the following fields:

a. An instruction tag (ITAG) that identifies the address of an instruction;

b. LM pointer to the last memory line accessed by that instruction;

c. H history information.

In this embodiment, the number of lines or size ($S_{IT}$) of IT is smaller than that of the instruction cache of the computer by a factor of 4. The MT table includes the information about recently referenced memory lines, which are not necessarily brought to cache. As illustrated in FIG. 5b each entry in the MT table includes the following fields:

a. a memory tag (MTAG) that identifies the memory line, b. R provides the number of accesses to the memory line. In this example, the size ($S_{MT}$) of MT is the same as that of the data cache.

The process of accessing IT and MT is as follows. Based on the low order bits of the address of instruction I, a respective entry EI in the IT is found. If the $ITAG_{EI}$ field of this entry matches the high-order bits of I's address, it is assumed that I is found in $IT_{EI}$. Then low ($LM_{EI}$) is used to find an entry EM in the MT table that may keep the last memory line accessed by I's last execution. $MTAG_{EM}$ is compared with the high ($LM_{EI}$) to verify that indeed the right memory line is located in $MT_{EM}$. Only then can $R_{EM}$ be used to make the decision about cached or non-cached access.

If a needed instruction cannot be found in IT, or a needed memory line cannot be found in MT, a decision is made to perform a cached access. Then, both the executed instruction and the accessed memory line are established in IT and MT respectively and $H_L$ is set to 1.

The process of replacing entries in IT and MT is governed by the LRU replacement algorithm in the same way as conventional cache directories.

2. Collision Tables

In this type of table the tag fields that identify instructions in IT and memory lines in MT are not kept. Also, rather than keeping the whole LM pointer in IT, only its lower order bits that are sufficient to address one of the entries in MT (denoted by low(LM)) in the following) are maintained. This allows collisions among different instructions, when looking into IT, and among different memory lines, when accessing the information in MT.

As illustrated in FIG. 6a, the IT table includes only the following fields:

a. low(LM) pointer, b. H history information.

As illustrated in FIG. 6b, the MT table includes only the R field. Collision tables provide a trade-off between the amount of space required to implement the IT and MT tables and the precision of the proposed algorithms.

In the case of collision tables the process of accessing IT and MT is much simpler than for Set Associative Tables. Based on the low-order bits of the address of instruction I, a respective EI entry in IT is found. Without any further checking low($LM_{EI}$) field is used to access the MT table and find the EM entry there. Again, without any further checking the $R_{EM}$ field is used to make a decision about whether to make a cached or non-cached access. This implementation allows collision between a few instructions matching a single entry of the IT table and a few memory lines matching a single entry of the MT table. This may adversely affect the accuracy of the method, however, it has the advantage of reducing the amount of memory space required to keep the IT and MT tables.

Again, if a needed instruction cannot be found in IT, or a needed memory line cannot be found in MT, a decision is made to perform a cached access. Then, both the executed instruction and the accessed memory line are established in IT and MT respectively and $H_L$ is set to 1.

Access to the IT table in both embodiments is made during the instruction decode phase and access to the MT table is simultaneous with the access to the cache itself.

We claim:

1. A cache control system for use in a computer system including a processor, main memory and cache memory in which memory locations are arranged in memory lines, each line having an associated index, and which is capable of executing cached and non-cached memory accesses, comprising:

a frequency value store for each of a number of the memory lines for storing a frequency value indicative of the number of accesses made thereto;

an instruction store for storing the index of the last memory line accessed by each of a number of instructions; and control logic, comprising:

(a) means for testing the frequency value for the last memory line accessed by the current instruction, each time the processor attempts to access a memory location not in the cache memory;

(b) means for fetching the memory line of a memory location which is not in the cache memory from the main memory into the cache memory and executing a cached memory access if the number of accesses for that memory line exceeds a predetermined threshold, and for executing a non-cached memory access if the number of accesses for that memory line does not exceed the predetermined threshold.

2. The cache control system of claim 1 wherein the instruction store and the frequency value store are least recently used (LRU) set associative tables.

3. The cache control system of claim 1 wherein the instruction store and the frequency value store are collision tables.

4. The cache control system of claim 1 wherein the instruction store includes means for storing a history value for each of the instructions and wherein the control logic includes: means for increasing a history value each time execution of an associated instruction results in a cached memory access and for decreasing that history value each time execution of the associated instruction results in a non-cached memory access; and means for testing the history value for the current instruction and executing a cached memory access only if the history value for the current instruction has passed a predetermined threshold.

5. The cache control system of claim 4 wherein the control logic includes means for executing a cached memory access if the processor attempts to access a memory location not in the cache memory and information associated with the current instruction cannot be found in the instruction store or a frequency value for the last memory line accessed by the current instruction cannot be found in the frequency value store.

6. A method of operating a computer system comprising a processor, a main memory and a cache memory in which memory locations are arranged in memory lines, each line having an index associated therewith, the method comprising, maintaining, for each of a number of the memory lines, a stored frequency value indicative of the number of accesses made thereto;

maintaining, in an instruction store, the index of the last memory line accessed by each of a number of instructions;

and, in the event of a cache miss, testing the stored frequency value associated with the last memory line accessed by the current instruction, and if the number of times that the last memory line has been accessed has passed a threshold value, fetching the memory line into the cache and executing a cached memory access, and if the number of times that the last memory line has been accessed has not passed the threshold value, executing a non-cached memory access.

7. The method of claim 6 further comprising the steps of:

maintaining, in the instruction store, a history value for each of the instructions, the step of maintaining a history value for each of the instructions including the steps of: (a) increasing a history value each time execution of an associated instruction results in a cached memory access and (b) decreasing that history value each time execution of the associated instruction results in a non-cached memory access; and, each time the processor attempts to access a memory location not in the cache memory, testing the history value for the current instruction and only executing a cached memory access if the history value for the current instruction has passed a predetermined threshold.

* * * * *